United States Patent
Schultz et al.

(10) Patent No.: US 12,497,899 B1
(45) Date of Patent: Dec. 16, 2025

(54) PREVENTING ABNORMAL FAN BLADE DEFLECTION OR FAN FLUTTER WITH RETROREFLECTORS

(71) Applicant: General Electric Company, Cincinnati, OH (US)

(72) Inventors: Phillip Schultz, Cincinnati, OH (US); Drew Michael Capps, Avon, IN (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/743,747

(22) Filed: Jun. 14, 2024

(51) Int. Cl.
| | |
|---|---|
| *F01D 5/26* | (2006.01) |
| *F01D 17/02* | (2006.01) |
| *F01D 21/00* | (2006.01) |
| *F04D 29/66* | (2006.01) |
| *G01B 11/16* | (2006.01) |
| *G01H 9/00* | (2006.01) |

(52) U.S. Cl.
CPC ............. *F01D 5/26* (2013.01); *F01D 17/02* (2013.01); *F01D 21/003* (2013.01); *F04D 29/668* (2013.01); *F05D 2220/36* (2013.01); *F05D 2230/13* (2013.01); *F05D 2260/83* (2013.01); *F05D 2260/96* (2013.01); *F05D 2270/334* (2013.01); *F05D 2270/804* (2013.01); *F05D 2270/8041* (2013.01); *F05D 2270/821* (2013.01); *G01B 11/16* (2013.01); *G01H 9/00* (2013.01)

(58) Field of Classification Search
CPC .......... F01D 21/003; F01D 5/26; F01D 17/02; F05D 2270/334; F05D 2260/83; F05D 2260/96; F05D 2230/13; F05D 2270/804; F05D 2270/8041; F05D 2270/821; G01B 11/16–164; G01H 9/00; F04D 29/668; G01J 1/0238; G01J 3/0278
See application file for complete search history.

(56) References Cited

U.S. PATENT DOCUMENTS 4,060,329 A * 11/1977 Ellis ..................... G01M 9/06
 356/614
4,080,823 A * 3/1978 Stargardter ............. G01H 9/00
 73/656

(Continued)

FOREIGN PATENT DOCUMENTS

| DE | 102016121427 | 5/2018 |
|---|---|---|
| WO | 2006110532 | 10/2006 |

*Primary Examiner* — Sabbir Hasan
*Assistant Examiner* — Art Golik
(74) *Attorney, Agent, or Firm* — Hanley, Flight & Zimmerman, LLC

(57) ABSTRACT

A system for preventing abnormal fan blade deflection or fan flutter includes an optical emitting source, an optical receiver, and a retroreflector for attachment to a fan blade of an engine. The system emits radiant flux from the optical emitting source towards the retroreflector when the engine is operating; receives an incident radiant flux from the retroreflector by the optical receiver; determines a deflection value of the fan blade based on the incident radiant flux received by the optical receiver; determines whether the deflection value is greater than or equal to a threshold for deflection of the fan blade to identify abnormal fan blade deflection or fan flutter; and selectively changes a state of the engine when abnormal fan blade deflection or fan flutter is identified.

22 Claims, 13 Drawing Sheets

(56) References Cited

U.S. PATENT DOCUMENTS

| | | | | |
|---|---|---|---|---|
| 4,086,808 | A * | 5/1978 | Camac | G01H 1/006 |
| | | | | 356/486 |
| 4,334,777 | A * | 6/1982 | Bien | G01B 9/02003 |
| | | | | 356/485 |
| 4,951,500 | A | 8/1990 | Twerdochlib et al. | |
| 7,502,128 | B2 * | 3/2009 | Heyworth | G01N 21/8806 |
| | | | | 356/614 |
| 8,256,297 | B2 * | 9/2012 | Sue | G01H 1/006 |
| | | | | 73/660 |
| 10,711,703 | B2 * | 7/2020 | Rosenkrans | F01D 17/14 |
| 11,396,847 | B2 | 7/2022 | Rosenkrans et al. | |
| 2002/0057873 | A1 * | 5/2002 | Wu | G02B 6/262 |
| | | | | 385/33 |
| 2018/0274385 | A1 * | 9/2018 | Seely | G05B 13/042 |
| 2019/0376411 | A1 * | 12/2019 | Ball | F01D 21/003 |
| 2023/0390866 | A1 * | 12/2023 | Brookhyser | B23K 26/0648 |

* cited by examiner

PREVENTING ABNORMAL FAN BLADE DEFLECTION OR FAN FLUTTER WITH RETROREFLECTORS

TECHNICAL FIELD

This disclosure relates to engine fan blade abnormalities, and, more particularly, to preventing abnormal fan blade deflection or fan flutter in engines of aerial vehicles.

BACKGROUND

Fan flutter and abnormal blade deflection in aircraft engines can have serious negative impacts on aircraft, not only reducing engine efficiency but also leading to structural damage and safety risks. Oscillating forces induced by fan flutter can fatigue fan blades, potentially leading to the development of cracks and breaks. Fan flutter and other abnormal blade deflection can also disrupt the flow of air through the engine, decreasing fuel efficiency and increasing maintenance costs.

Strain gauges and light probes have historically been used to capture fan blade deflection or fan flutter. Strain gauges require contact and must be physically attached to engine components such as the fan blades to provide vibrational measurements. Further, strain gauges may require complex calibration and maintenance to ensure continuously accurate readings. The readings provided by strain gauges provide challenges with data interpretation, as normal vibrations are difficult to distinguish from flutter or other abnormal fan responses. Also, as mentioned earlier, strain gauges are only capable of providing point-measurements. At best, the use of strain gauges may lead to noncomprehensive data, and at worst, strain gauges may be placed in locations which entirely miss critical flutter areas. Furthermore, the installation of strain gauges on fan blades may impact the functioning of the fan blades, and may therefore affect engine performance. Thus, while strain gauges are usable during test and development, they often cannot be implemented into real-time operation.

Light probes provide a non-contact means to measure fan flutter and deflection in engines and/or aerial vehicles. However, standard light probes require placement immediate to the component to be measured. In the case of engines, light probes must be placed within inches of the tip of the fan blade, and often must be placed mere thousandths of an inch from the tip of the fan blade. Like strain gauges, standard light probes may also provide noncomprehensive measurements, as they can only provide measurements for the tips of the fan blades. Additionally, standard light probes are difficult to implement in open fan architectures, that is, configurations in which the engine fan is not confined within a nacelle or other housing, and which therefore lack a close mounting location for the probe.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

DETAILED DESCRIPTION

Figure 1:
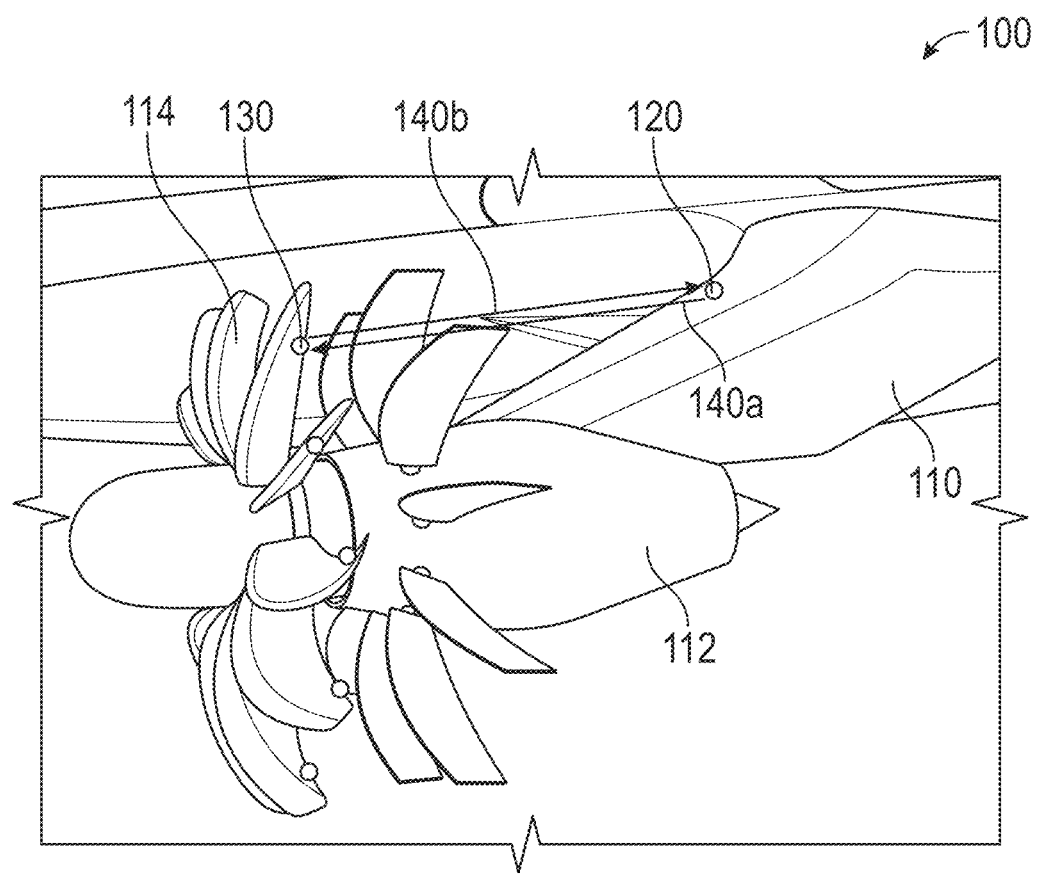
FIG. 1 is a perspective view of a portion of an aerial vehicle having an engine and illustrating a system for preventing abnormal fan blade deflection or fan flutter of the engine, in accordance with an aspect of this disclosure.

Aspects of the presently disclosed system for detecting fan blade deflection are described in detail with reference to the drawings, in which like reference numerals designate identical or corresponding elements in each of the several views.

Although this disclosure will be described in terms of specific aspects, it will be readily apparent to those skilled in this art that various modifications, rearrangements, and substitutions may be made without departing from the spirit of this disclosure.

For the purpose of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the features illustrated herein, and any additional applications of the principles of this disclosure, as illustrated herein, which would occur to one skilled in the relevant art and having possession of this disclosure, are to be considered within the scope of this disclosure.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

A common challenge in detecting fan flutter and other undesirable engine fan responses during development and operation is the need for sensors or light probes which are in contact with and/or placed extremely short distances from the fan blade. In addition to sensors being intrusive and cumbersome to install within engine systems, sensors and standard light probes are only capable of providing localized measurements, usually isolated to the tips of the engine's fan blades.

To address the limitations of known sensors and standard light probes, retroreflectors may be employed to provide a long-range, contactless measurement system for detecting fan flutter and fan blade deflection. Retroreflectors are passive, optical reflectors designed to reflect radiant flux directly back to an optical emitting source from a wide range of incident angles with minimal scattering, regardless of the angle of incidence. In instances, retroreflectors may successfully reflect radiant flux at angles of about 60 degrees from a normal angle of incidence, and may do so omnidirectionally. The high intensity and consistent reflective properties provided by retroreflectors provide less constrained placement at a variety of angles and distances, and also enables measurements to be taken at locations aside from the fan blade tips.

This disclosure provides a system for detecting deflection and/or flutter of a fan blade of an engine of an aerial vehicle (e.g., an aircraft). An optical emitting transducer (source/emitter) emits radiant flux toward a retroreflector disposed on the fan blade. The emitted radiant flux is directed and transmitted from any appropriate location to be within line of sight and an appropriate incident angle of the retroreflector (e.g., direct, beam steering, waveguide transmitted, etc.). The emitted radiant flux is incident upon the retroreflector, leading to incident radiant flux being reflected back toward the emitting source. With an optical detecting transducer (e.g., an optical receiver and/or optical detector) placed in close proximity to the emitter, a portion of the retroreflected radiant flux is incident on the detector. The detector transduces the incident radiant flux into an electrical signal. The signal is then analyzed, and abnormal deflection and/or fan flutter is distinguished from other acceptable forms of vibration.

Overall, the use of retroreflectors enables longer range measurement of deflection as compared to traditional methods. Retroreflectors offer consistent reflection back to the emitting source within a broad range of incident angles, reducing effort in implemented placement and alignment. Based on the materials used to fabricate, retroreflectors provide broad optical bandwidth for flexibility in choice of optical emitter source. Optical filters and/or coatings may also be implemented onto the retroreflector for applications where only specific bandwidths are desired. Retroreflector structures may be fabricated in a variety of sizes, standalone or arrayed, out of a rigid or flexible material. Typically, scaling these structures down to smaller dimensions enable fabrication of the retroreflector structures in arrays out of flexible and conformal film or sheeting materials allowing for conformal application to a variety of substrate materials and shapes.

Moreover, retroreflectors provide a variety of safety benefits during testing, development, and/or real-time use. The high-intensity reflective capabilities of retroreflectors permit long range measurement, allowing test equipment to be placed farther away from an aircraft engine and/or operating aircraft. This reduces the potential of injury from moving parts. In addition, retroreflectors may serve to alert individuals within the evaluation area of various moving components, thereby maintaining vigilance during operation when an individual must remain within a close distance to the operating site. For example, to evaluate components including retroreflectors, an individual may have a source of radiant flux aligned collinear with the individual's eyes (e.g., a forehead light, a flashlight held within close proximity to the viewing direction of the individual's eyes, a work light mounted behind the individual, etc.). Retroreflectors are optically efficient and therefore enable the use of lower power optical emitting sources which have output irradiances (power per unit area) less than the human eye's maximum permissible exposure (MPE), thus preventing retinal damage.

Figure 2:
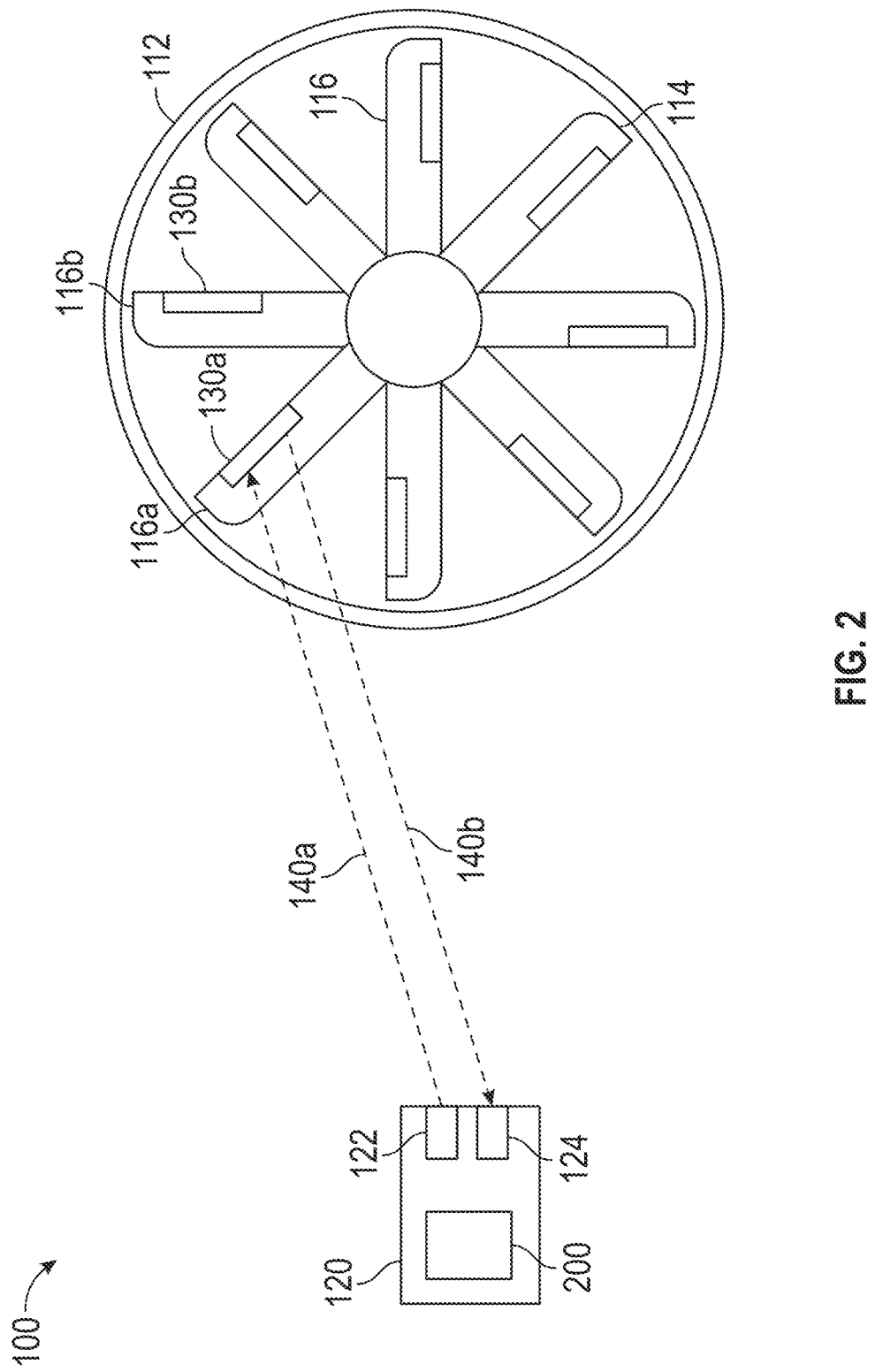
FIG. 2 is a schematic view illustrating retroflectors of the system of FIG. 1 interacting with an optical receiver of the system of FIG. 1.
Figure 3:
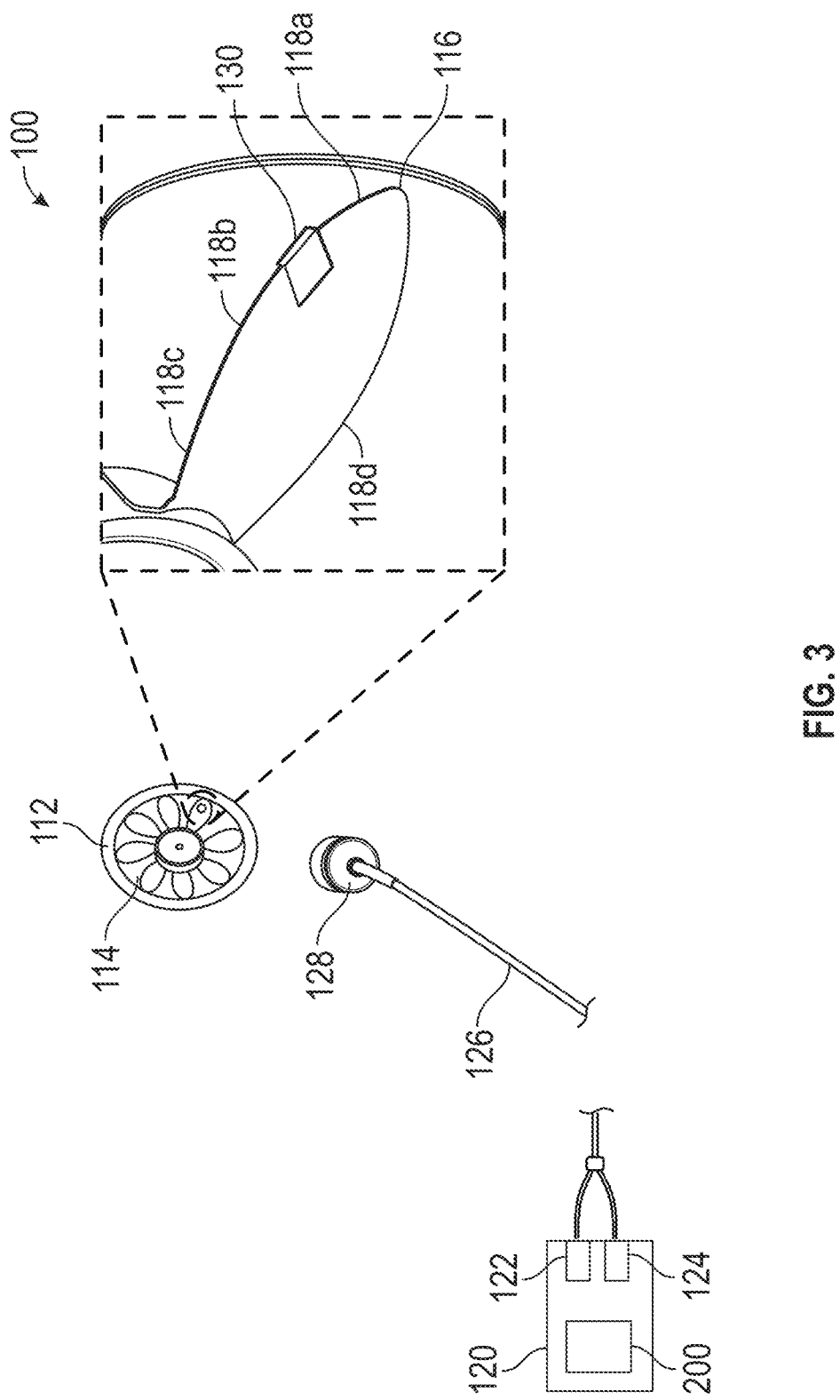
FIG. 3 is a view of a test configuration of the system of FIG. 1 and illustrates an enlarged view of the fan blade of the engine to delineate the retroreflectors of the system shown in FIG. 1.

FIGS. 1 through 3 illustrate a system 100 for preventing abnormal fan blade deflection of a fan blade or fan flutter of an engine 112 of an aerial vehicle 110, particularly during testing and development, to ensure safe and stable operation during flight. Although the engine 112 described herein may be any suitable component which employs fan blades or is capable of deflection, in the interest of brevity, the engine 112 is described herein in connection with an engine of an aerial vehicle. Applications of system 100 towards fans, engines, and the like related to alternate vehicle types are contemplated as well.

The system 100 generally includes an optical emitting source 122 configured to emit radiant flux (e.g., an optical emitter), a retroreflector 130 configured to be disposed on a component of an aerial vehicle 110 and configured to be interrogated by the emitted radiant flux, an optical receiver 124 configured to receive the retroreflected radiant flux from the retroreflector 130 (e.g., an optical transduction device, an optical detector, or the like), and a controller 200 in communication with the optical emitting source 122, the optical receiver 124, and the component of the aerial vehicle 110. In aspects, the component of the aerial vehicle 110 is a portion of a fan 114 of an engine 112, in particular, a fan blade 116 of the fan 114. The controller 200 is configured to determine abnormal deflection and/or fan flutter of the fan blade 116 and/or fan 114, and may be configured to act as an optical emitter driver and to perform receiver signal conditioning, data acquisition, processing, and digital communications.

Both optical emitting source 122 and optical receiver 124 are coupled to (e.g., included within) an electronics housing 120 (e.g., an emit-and-receive box). Electronics housing 120, and therefore optical emitting source 122 and optical receiver 124, are configured to be disposed in any appropriate location within a line of sight to retroreflector 130. For example, when system 100 is implemented into aerial vehicle 110, electronics housing 120, in aspects, is configured to be disposed on an engine 112, a pylon, a wing, or a fuselage of aerial vehicle 110.

Optical emitting source 122 may be, for example, a laser emitter. Optical emitting source 122 may have an optical power of between 0.1 to 1,000 milliwatts (mW), though other ranges are also contemplated. The optical emitting source 122 may include a waveguide 126 which is coupled to an optical emitting transducer. The waveguide 126 may be an optical fiber or optical fiber bundle, or may include a component configured to contain and transmit radiant flux from one end of the component to another. The optical emitting transducer may generate radiant flux 140*a* which is transmitted via the waveguide 126 toward retroreflector 130. In aspects, particularly for short-range applications, radiant flux 140*a* may be coupled into a waveguide 126 which transmits and emits radiant flux 140a into free space. For both short- and long-range applications, an optics housing 128 may be integrated at one or more ends of the waveguide 126. The optics housing 128 may be, or contain, one or more components used for radiant flux beam shaping (e.g., a collimator, lens, aperture, film, diffuser, axicon, refractive optic, diffractive optic, arrayed optic, etc.). In aspects, optics housing 128 may be used to shape, transmit, and emit radiant flux 140a from the waveguide 126 or optical emitting source 122. For applications which require differing spot sizes or shapes, an adjustable version of optics housing 128 may be used. Radiant flux 140a may be visible light having a wavelength between about 400 and 700 nanometers, near infrared radiation having a wavelength of about 700 to 1,400 nanometers, shortwave infrared radiation having a wavelength of about 900 to 1,700 nanometers, or may have any other suitable wavelength. Generally, radiant flux 140a may have a wavelength of about 400 to 1,600 nanometers.

As will be described in greater detail, radiant flux 140a interrogates retroreflector 130, and incident radiant flux 140b is reflected toward optical receiver 124. Optical receiver 124 may include a waveguide 126 which is coupled to an optical detecting transducer. The waveguide 126 may be an optical fiber or optical fiber bundle, or may include a component configured to contain and transmit radiant flux from one end of the component to another. The waveguide 126 may be configured to receive incident radiant flux 140b and transmit incident radiant flux 140b to the optical detecting transducer which is configured to convert the incident radiant flux 140b to an electrical signal. In aspects, particularly for short-range applications, radiant flux 140a may be coupled into a waveguide 126 which receives and transmits radiant flux 140a from free space. For both short- and long-range applications, an optics housing 128 may be integrated at one or more ends of the waveguide 126. The optics housing 128 may be, or contain, one or more components used for radiant flux beam shaping (e.g. collimator, lens, aperture, film, diffuser, axicon, refractive optic, diffractive optic, arrayed optic, etc.). In aspects, optics housing 128 may be used to receive, shape, transmit, and couple radiant flux 140a into a waveguide 126 or optical receiver 124. For applications which require differing receiving or coupling efficiencies, an adjustable version of optics housing 128 may be used.

In aspects, an emitting cable may be assembled with one or more emitting waveguides 126 and a receiving cable may be assembled with one or more receiving waveguides 126. In aspects, the one or more emitting waveguides 126 and the one or more receiving waveguides 126 may be integrated with one another into a single waveguide 126 bundle, where the emitting waveguide(s) 126 are separately coupled to the optical emitting source(s) 122 and the receiving waveguide(s) 126 are separately coupled to the optical receiver(s) 124. Emitting waveguides 126 and receiving waveguides 126 may be contained within electronics housing 120, and/or optical emitting transducer and optical detecting transducer may be contained within electronics housing 120. In aspects, all components of optical emitting source 122 and optical receiver 124 are contained within electronics housing 120.

Retroreflector 130 may be disposed on fan blade 116 of fan 114 of engine 112. Specular or semi-specular reflectors require the optical receiver 124 to be placed a certain distance from the optical emitting source 122 proportional to an incident angle on a surface being measured. In contrast, retroreflectors are optical devices which return incident radiant flux back to a source where an angle of incidence is within about plus or minus 60 degrees with sufficient radiant flux 140a for signal analysis, thus reducing constraints on placement angles and distances. Compared to Lambertian reflectors (e.g., matte or diffuse reflectors), retroreflectors provide a significantly higher and more directed reflected radiant flux, allowing reduced power of optical emitting source 122 to be used. Retroreflectors are available in various formats, including, for example, corner cube or prismatic retroreflectors, glass bead retroreflectors, and full cube retroreflectors. Retroreflectors may be singular optical elements, or arrays thereof. Retroreflector 130 may take the form of a polymer film which is adhered to fan blade 116, though retroreflector 130 may take other forms as well. Retroreflector 130 may be attached to fan blade 116 or other suitable components of aerial vehicle 110 via any suitable technique such as adhesive, welding, friction-fit, atomic bonding, or the like. In aspects, retroreflector 130 may be a retroreflective feature machined directly into a surface of fan blade 116 or any other component of interest.

Retroreflector 130 may be sized based on factors such as intended application, a wavelength of radiant flux 140a, or an optical power of optical emitting source 122. Due to the increased intensity and optical power provided by retroreflector 130, retroreflector 130 is configured to reflect radiant flux 140a from optical emitting source 122 back to the source of emission of radiant flux 140a, that is back to optical emitting source 122. Further, retroreflector 130 is configured to reflect radiant flux which is angled as far as about 60 degrees from a normal incidence angle of retroreflector 130. Additionally, depending upon emitted optical power, irradiance and angle incident upon the retroreflector 130, optical receiver 124 sensitivity, and wavelength, optical emitting source 122 may be separated by large distances from retroreflector 130 such that retroreflector 130 and optical emitting source 122 are configured to maintain a cooperative arrangement with one another to, for example, emit, reflect, and/or receive energy (e.g., light or radiant flux) from/to/between one another. In aspects, a distance between optical emitting source 122 and retroreflector 130 may be about 0.001 to 20 feet, though optical emitting source 122 and retroreflector 130 are configured to maintain the cooperative arrangement with one another when separated by distances exceeding several kilometers.

Once radiant flux 140a is emitted from optical emitting source 122 of electronics housing 120, radiant flux 140a interrogates retroreflector 130. Retroreflector 130 then reflects an incident radiant flux 140b at a high intensity back toward electronics housing 120, and thereby toward optical receiver 124. Optical receiver 124 detects and transduces incident radiant flux 140b into an electrical signal to be analyzed by controller 200. Optical receiver 124 may include a singular optical transducer, or may include an array or plurality of optical transducers. Optical receiver 124 may include one or more avalanche photodiodes (APDs), one or more photodiodes, one or more photomultiplier tubes (PMTs), one or more photon counting APDs, one or more complementary metal oxide semiconductors (CMOS) imagers, one or more charge-coupled device (CCD) imagers, or the like. It is contemplated that optical receiver 124 may include any singular transducer or array of transducers. In aspects, optical receiver 124 may include a singular avalanche photodiode which, with or without combination of additional electronic components, converts received incident radiant flux 140b to a current or voltage reading. Once converted to an electrical signal, such as a current or voltage reading, incident radiant flux 140b received by optical receiver 124 is evaluated to distinguish abnormal fan blade deflection and fan flutter from other forms of acceptable vibration.

Turning to FIG. 2 in particular, which illustrates a schematic diagram of system 100, each fan blade 116 of engine 112 may include at least one retroreflector 130. Electronics housing 120 may include both optical emitting source 122 and optical receiver 124, and may additionally include controller 200. Controller 200 may also be located in any other suitable location. Fan 114 may include a first fan blade 116a, an adjacent second fan blade 116b, and so on. First fan blade 116a may include a first retroreflector 130a attached to first fan blade 116a at a first known position and second fan blade 116b may include a second retroreflector 130b attached to second fan blade 116b at a second known position, with the same pattern applying for all subsequent fan blades 116. Fan 114 is powered on for rotating fan blades 116, and optical emitting source 122 emits radiant flux 140a toward fan 114. Radiant flux 140a interrogates each retroreflector 130a, 130b, and so forth, and incident radiant flux 140b is reflected back to optical receiver 124. Controller 200 then analyzes the data obtained by optical receiver 124 to determine the deflection of fan blades 116a, 116b, and so on.

In the alternative to, or in addition to, determining a deflection of the fan blades 116, a magnitude, phase, and/or frequency of vibration may be analyzed by controller 200. For example, once fan 114 is powered on to rotate, optical emitting source 122 emits radiant flux 140a toward fan 114. Radiant flux 140a may consecutively interrogate each retroreflector 130a, 130b of fan blades 116a, 116b, and so on, and incident radiant flux 140b is reflected back to optical receiver 124. A magnitude of vibration can be quantified by considering the range of deflections observed within a set of returned deflections. By conducting a Fast Fourier Transform (FFT) of a set of returned deflections, the amplitude and phase of vibration may be expressed as a function of frequency. Therefore, in aspects, controller 200 determines a magnitude and frequency of vibration of each fan blade 116 at a location of each retroreflector 130, and deviations from standard magnitude and frequency are located.

In aspects, system 100 may be used to determine specific fan blade deflection quantifications. For example, more than one retroreflector 130 may be disposed on a fan blade 116 to determine fan blade twist and/or fan blade lean. For example, a retroreflector 130 may be disposed on each of a leading edge 118c of fan blade 116 (FIG. 3) and a trailing edge 118d of fan blade 116 (FIG. 3). In some aspects, any number of retroreflectors 130 may be grouped together. One or more optical emitting sources 122 and one or more optical receivers 124 (or one or more receiving waveguides 126 or one or more receiving waveguide 126 bundles) may be used in conjunction with two or more retroreflectors 130 that may be placed at a similar height on leading edge 118c and trailing edge 118d, respectively, and may be used to quantify twisting deflection. By using two optical receivers 124 (or receiving waveguides 126 or receiving waveguide 126 bundles) and by placing one or more retroreflectors 130 at different radial heights from one another, leaning deflection may be quantified. Through comparing deflections measured at different locations on fan blade 116, deflection quantifications such as twist deflection and lean deflection may be captured, compared with expected values, and used to detect abnormal deflections. Deflections from a consistent location on each fan blade 116 may be compared across multiple fan blades 116 to discern abnormal deflection. For example, abnormal deflection may be detected if a fan blade 116 with variable pitch is not moving with the same intended deflection as subsequent fan blades 116.

FIG. 3 shows system 100 in an evaluation or test configuration. Due to the high intensity reflective capabilities of retroreflector 130, electronics housing 120 and/or optics housing 128 may be separated from fan 114 and retroreflector 130 by a large distance (e.g., 500 meters). For evaluation purposes of engine 112 (e.g., testing and development), retroreflector 130 may be attached at various locations on fan blade 116 to discover any potential issues with fan flutter or fan blade deflection. A location of retroreflector 130 may also be optimized to correspond to the highest likelihood of flutter or deflection. Analytical models may be used to predict which modes are most likely to cause flutter or deflection, or which locations are optimized for detection of flutter or deflection, and retroreflector 130 may be placed accordingly. Again, due to the reflective capabilities of retroreflector 130 as opposed to a standard reflector, retroreflector may be placed in various areas on fan blade 116, and is not limited to a tip 118a of fan blade 116. Retroreflector may be located, for example, at tip 118a of fan blade 116, at a mid-chord 118b of fan blade 116, along leading edge 118c of fan blade 116 (e.g., free end portion of fan blade 116), along trailing edge 118d of fan blade 116 (e.g., a fixed end portion of fan blade 116), or in any other suitable location or grouping. At different locations of fan blade 116, fan blade 116 may show different propensities toward deflection or flutter. By evaluating multiple locations of fan blade 116, fan 114 of engine 112, or other components, such components may be made safer and more efficient. Further, during test and development, fan 114 may be pushed to a limit expected to result in fan flutter or deflection, and a boundary condition may be set by system 100 to ensure that the boundary condition does not occur during real-time operation. This is explained in greater detail with regard to FIG. 5.

Figure 4:
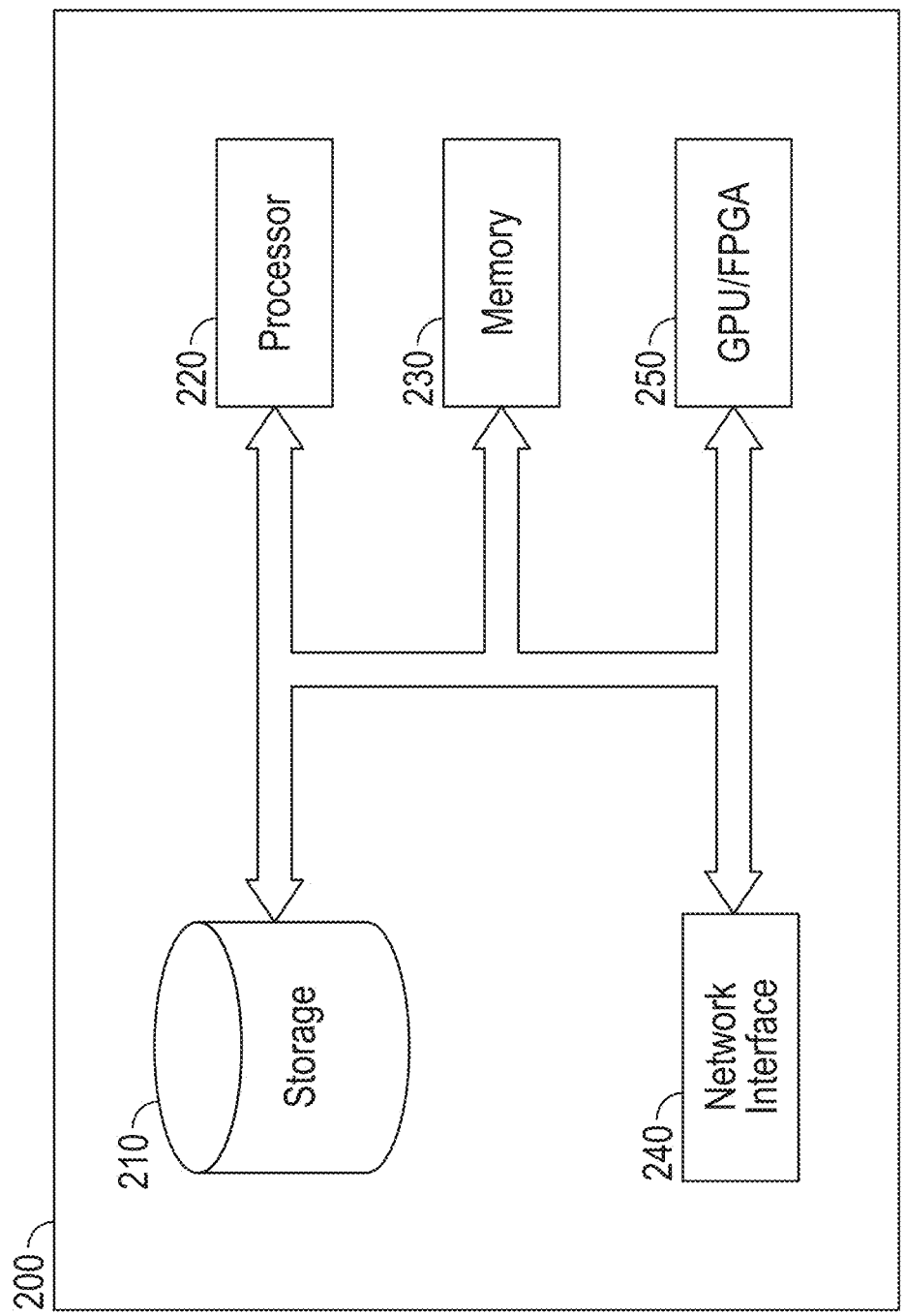
FIG. 4 is a block diagram of a controller of the system of FIG. 1.

FIG. 4 illustrates that controller 200 includes a processor 220 connected to a computer-readable storage medium or a memory 230. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU) 250, a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, magnetic non-volatile memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

In aspects, an analytics engine (e.g., a machine learning model and/or classical analytics) may be configured to perform the determinations. The analytics engine includes a machine learning model. The machine learning model may be based on a deep learning network, a classical machine learning model, or combinations thereof.

Figure 5:
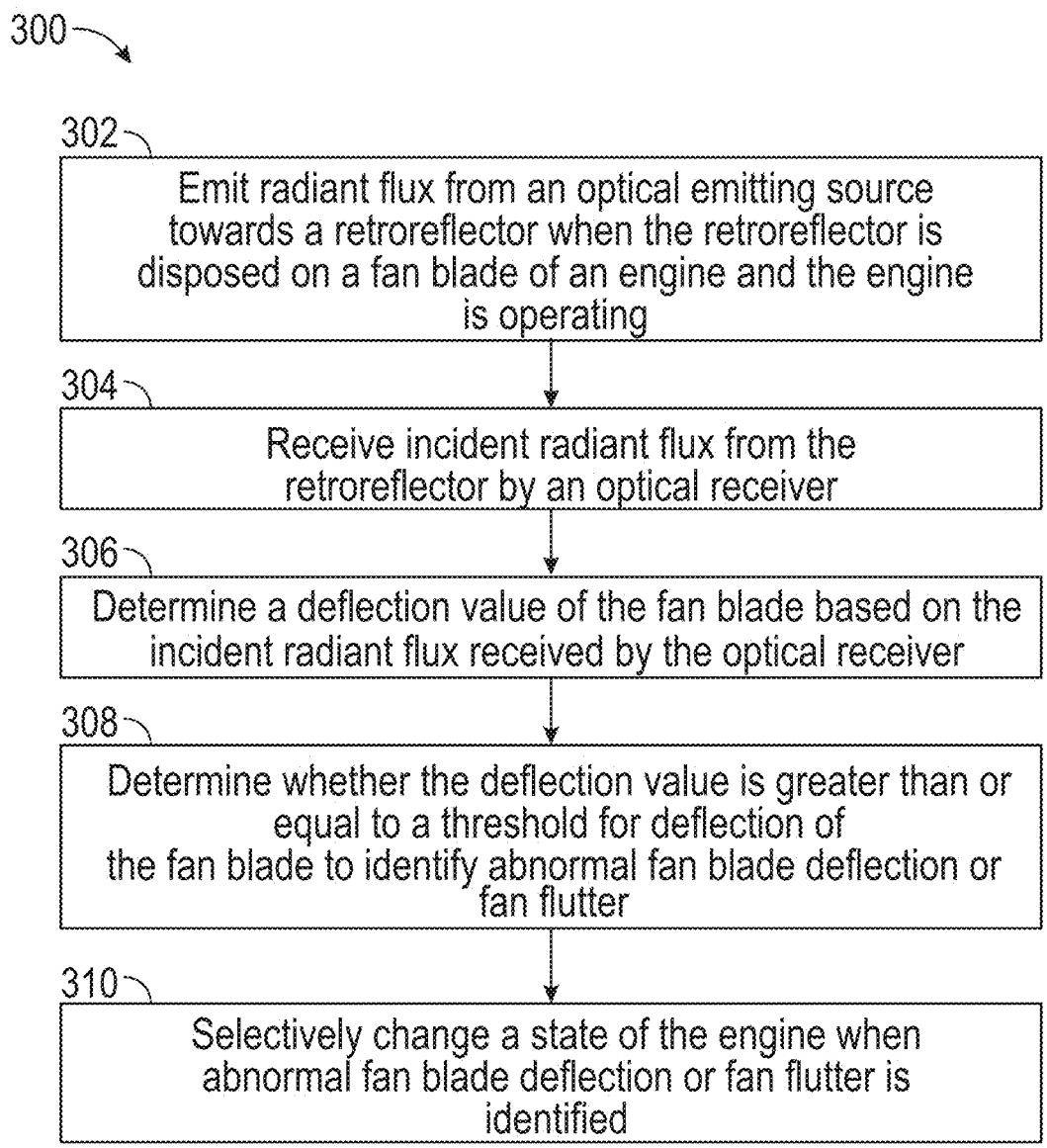
FIG. 5 is a flow diagram of a method for preventing abnormal fan blade deflection of a fan blade or fan flutter of the engine of FIG. 1 with the system of FIG. 1.

With regard to FIG. 5, a controller 200 or a user device, including, for example, a mobile device, an IoT device, or a server system, are configured to effectuate method 300. Method 300 may be employed during test, development, and/or during flight or operation of aerial vehicle 110. Prior to initiating method 300, or at any point during or after implementation of method 300, a threshold for deflection of fan blade 116 may be determined based on a parameter. Either of the threshold or the parameter may be predetermined and stored by controller 200. The threshold may correspond to a magnitude of vibration, a frequency of vibration, or a phase of vibration, or may be a response percentage, a measure in distance, an amplitude, or any other suitable characteristic or measurement of fan 114 or fan blade 116. In aspects, the parameter may be a material property of fan blade 116. For example, the material property may be a shape of fan blade 116, a size of fan blade 116, a material of fan blade 116, or the like. The parameter may also be based on a property of fan 114 or engine 112. For example, the parameter may be a torque, a velocity, a thrust, or a power of engine 112, aerial vehicle 110, or another component.

At first step 302, optical emitting source 122 emits radiant flux 140a toward retroreflector 130 disposed on fan blade 116 when engine 112 is operating. Radiant flux 140a interrogates retroreflector 130 and incident radiant flux 140b is reflected back toward optical emitting source 122. At second step 304, incident radiant flux 140b is received by optical receiver 124. Optical receiver 124 transduces incident radiant flux 140b into an electrical signal, such as a voltage.

At third step 306, a deflection value of fan blade 116 is determined by controller 200 based on the incident radiant flux 140b received by optical receiver 124. The deflection value corresponds to the threshold, and therefore may correspond to a magnitude of vibration, a frequency of vibration, a phase of vibration, a response percentage, a measure in distance, an amplitude, or the like. In aspects, the deflection value is determined by algorithm, such as FFT stored as instructions on memory 230 that is executable by processor 220. For example, the deflection value of fan blade 116 as determined by FFT analysis may be a magnitude of vibration and/or a phase of vibration of fan blade 116 as a function of frequency. Using FFT analysis, the electrical signals produced by the optical receiver 124 based on incident radiant flux 140b are decomposed by controller 200 into respective frequency components, each corresponding to a deflection value. Fan blades 116 have specific resonant frequencies which correspond to a dominant mode of vibration, that is, an acceptable amount of deflection of the fan blades 116. FFT analysis may determine the frequencies associated with the dominant mode of vibration, with outlier frequencies potentially being indicative of fan flutter or abnormal bending of fan blades 116. In particular, significant peaks in the FFT results may suggest bending in one or more fan blades 116 which may be highly detrimental to the performance and reliability of fan 114.

At fourth step 308, the determined deflection value is compared to the initially determined threshold. In particular, the determined deflection value is analyzed to establish whether the determined deflection value is greater than or equal to the threshold to identify abnormal fan blade deflection or fan flutter. At fifth step 310, controller 200 may selectively change a state of the engine 112, or one or more components thereof, when abnormal fan blade deflection or fan flutter is identified. For example, controller 200 may cause engine 112 to start, to stop, change speed, change power, change voltage, change current, change direction, etc., and/or combinations thereof to enable further analysis, repair, and/or replacement of engine 112 or one or more components thereof (e.g., fan blades 116) and/or to initiate further testing. In aspects, controller 200 may cause system 100 to output an alert indicating the state or condition of engine 112 (or one or more components thereof) based on the determination performed in fourth step 308. The alert may be an audio, visual, and/or haptic alert.

A visual alert may be displayed on an imaging device and/or a mobile device, such as a smartphone, tablet, laptop, e-reader, smartwatch, and/or virtual reality (VR) headset. In aspects, system 100 may output a visual alert to a display showing a portion of engine 112 (or one or more components thereof) which is deformed. The visual alert may include still images and/or videos, which a user may replay and review for further analysis. In aspects, the user may be able to view a 360-degree model replaying the images of engine 112 (or one or more components thereof), which the controller and/or imaging device may generate, and which may be configured to illustrate a location of an abnormality of the engine, fan, and/or one or more fan blades. An audio alert may be output via a speaker and may indicate excessive vibration of fan blades 116. The audio alert may be a ringing, chirping, beeping, and/or other loud noise configured to alert a user. In aspects, the alert may include an option to replay the specific noise emitted from fan blades 116. In another example, system 100 may output haptic feedback to a mobile device, such as a vibrational feedback, force feedback, and/or surface haptics.

In aspects, the controller 200 of system 100 may cause system 100 to output performance metrics, characteristics, and/or alerts. For example, after alerting the user of identified fan flutter and/or abnormal deflection of fan blade 116, a display may indicate details regarding an exact rotational speed of engine 112 or one or more components thereof at the time of occurrence of the fan flutter or abnormal fan blade deflection. In another example, a specific amount and/or location of flutter may be displayed, e.g., on a trailing edge 118d or mid-chord 118b of fan blade 116.

In the case that abnormal fan blade deflection or fan flutter is identified at fourth step 308, controller 200 may further be caused to set a boundary condition. Boundary conditions may be set, for example, during testing to ensure safe operation of engine 112 or may be determined and set during in-flight operation. The boundary condition may constrain a component of aerial vehicle 110 to prevent the determined deflection value from equating to or surpassing the threshold. In aspects, the boundary condition may correspond to a speed of fan 114, a speed of aerial vehicle 110 (e.g., a Mach number of aerial vehicle 110), a propellor torque, a propellor thrust, or a propellor power, among other conditions. For example, if the deflection value exceeds the threshold when aerial vehicle 110 is operating at Mach 0.9, a boundary condition may be set which prevents aerial vehicle 110 from exceeding about Mach 0.89.

In aspects, in response to identifying abnormal fan blade deflection or fan flutter at fourth step 308, controller 200 may change a torque, a thrust, and/or a power demand of fan 114, engine 112, or aerial vehicle 110. Changes to torque, thrust, or power demand may be accomplished by changing a speed of fan 114, a pitch angle of fan blade 116, an acceleration of the fan 114, or the like. Controller 200 may change a torque, a thrust, and/or a power demand during testing to aid in effectively selecting and setting a boundary condition or to bring engine 112 and/or aerial vehicle 110 to safe operation in real time. In aspects, controller 200 may change a speed of fan 114, a speed of aerial vehicle 110, a propellor torque, a propellor thrust, a propellor power, or the like to more effectively determine and set a boundary condition, or to ensure safe operation of engine 112 and/or aerial vehicle 110.

Figure 6:
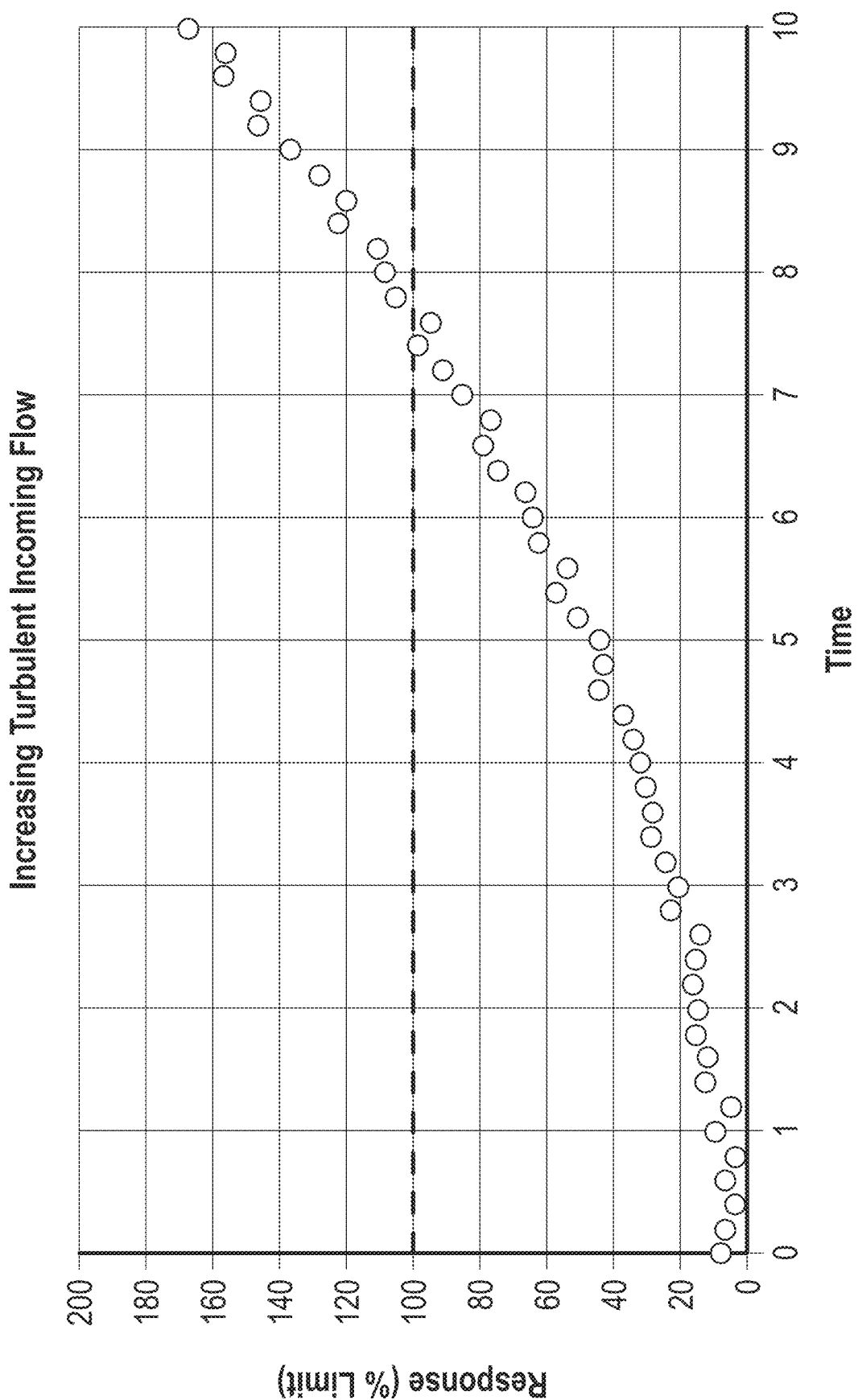
FIG. 6 is chart showing fan blade response to increasingly turbulent incoming flow over time.
Figure 7A:
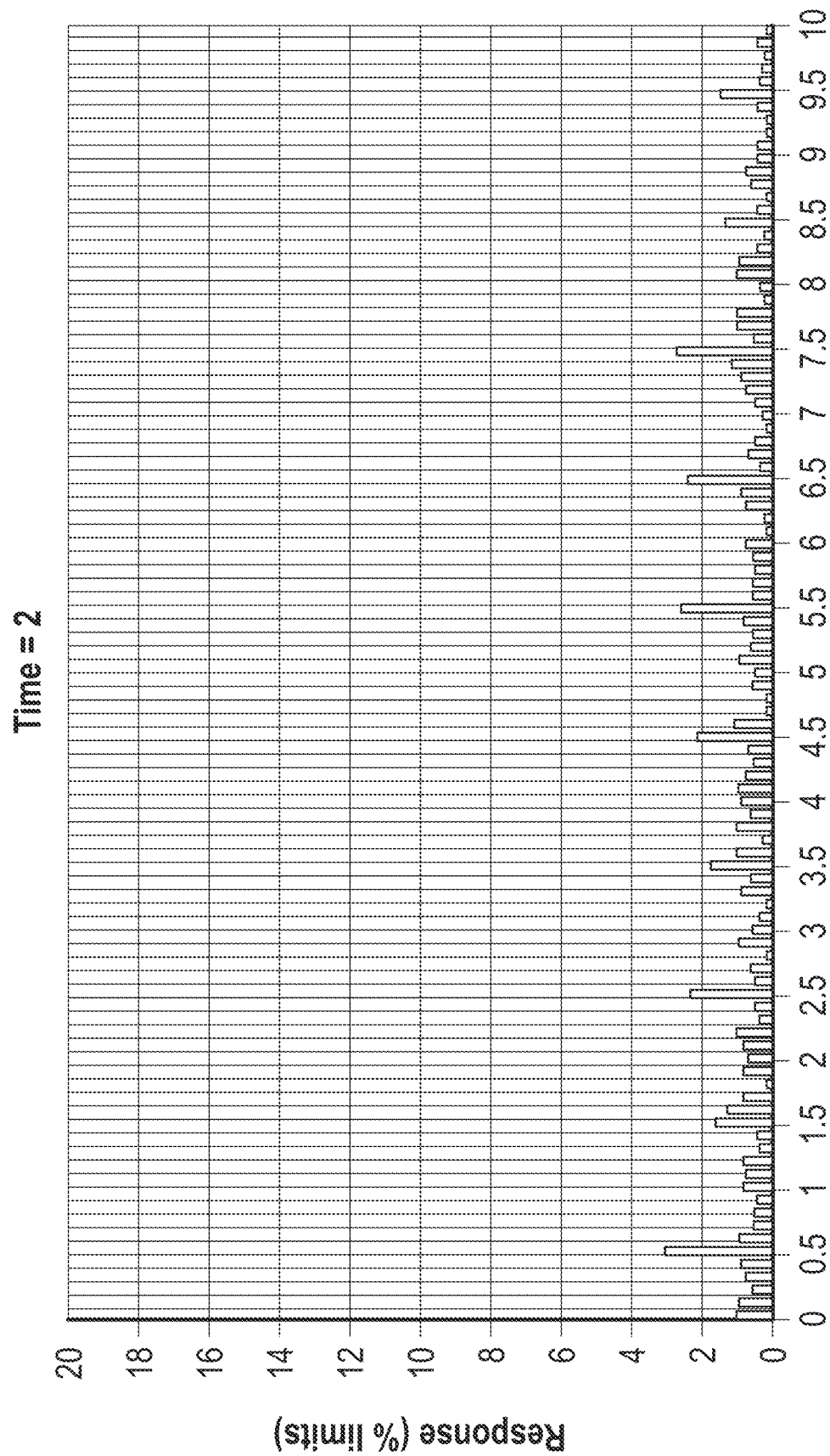
FIG. 7A is a chart showing a Fast Fourier Transform (FFT) of the data of FIG. 6 at time 2 of the chart shown in FIG. 6.
Figure 7B:
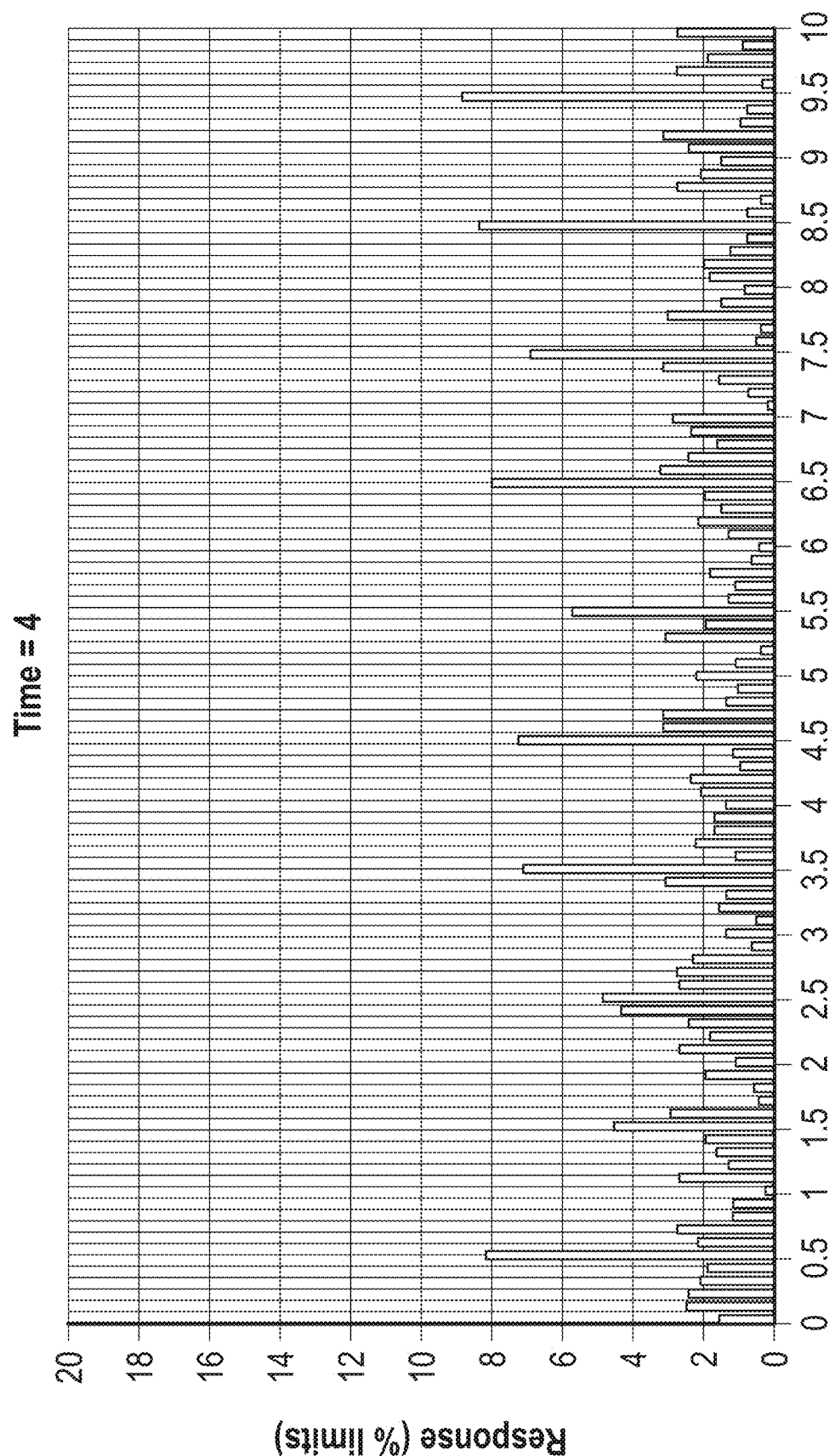
FIG. 7B is a chart showing a FFT of the data of FIG. 6 at time 4 of the chart shown in FIG. 6.
Figure 7C:
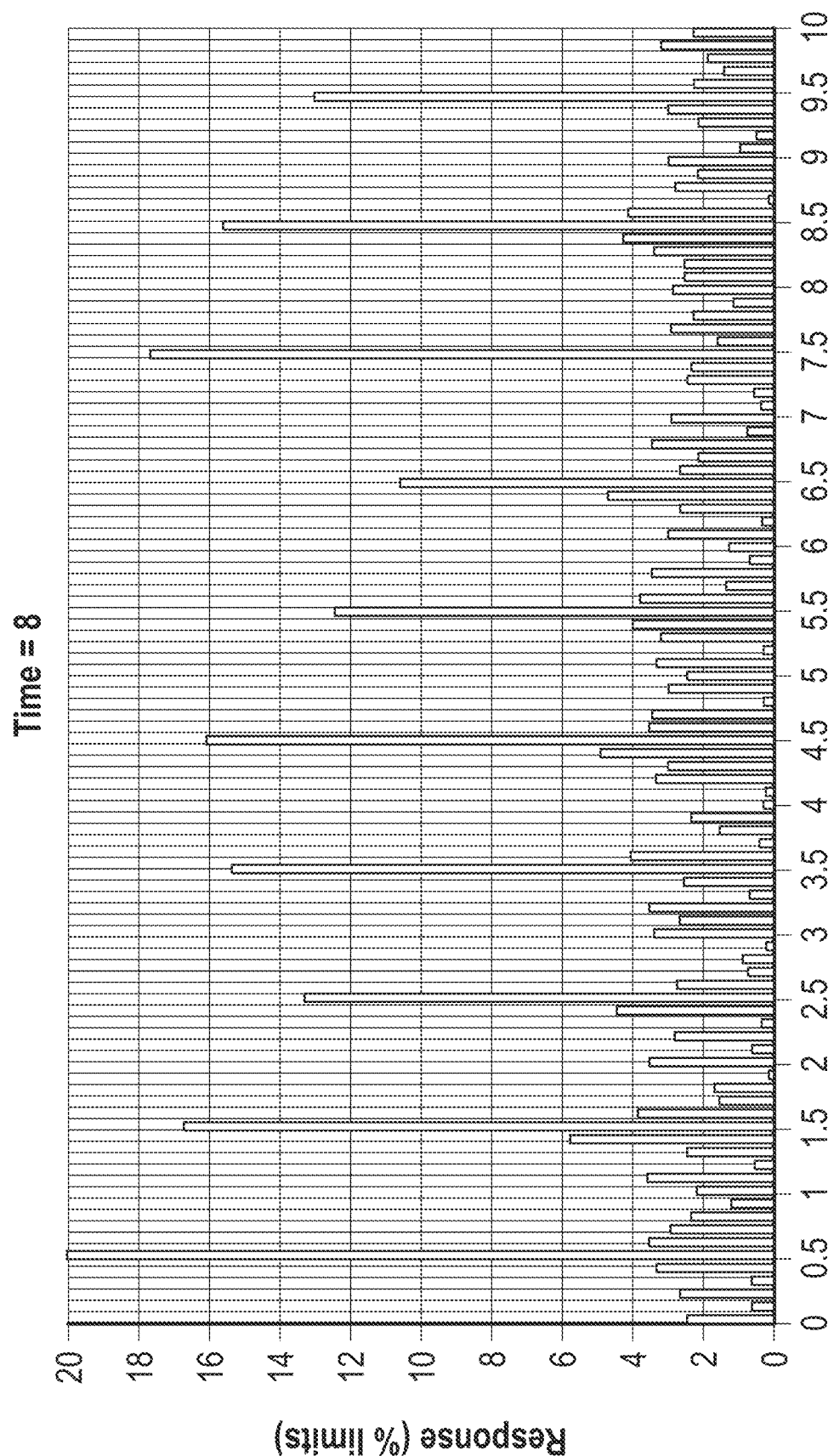
FIG. 7C is a chart showing a FFT of the data of FIG. 6 at time 8 of the chart shown in FIG. 6.
Figure 8:
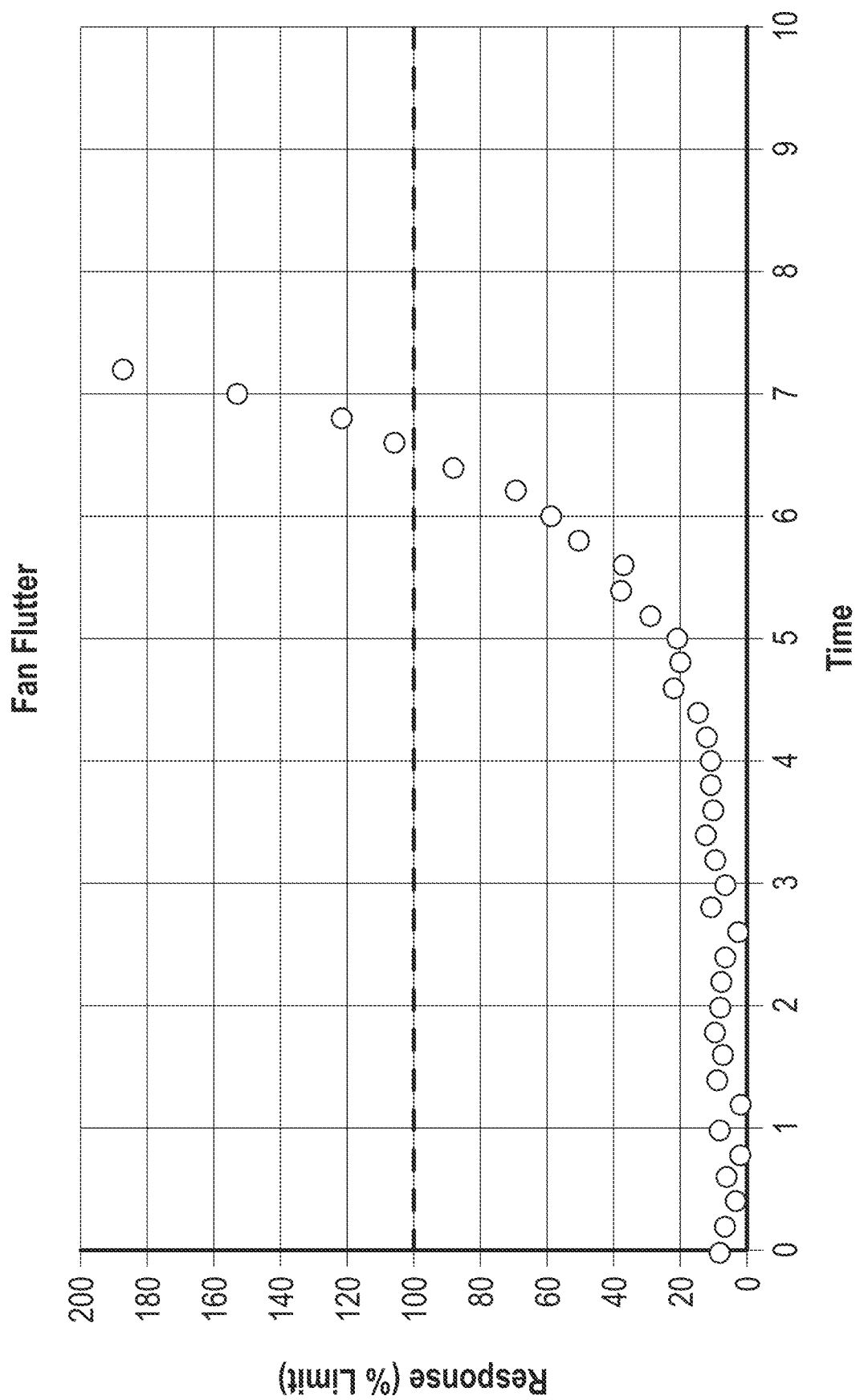
FIG. 8 is a chart showing a fan blade experiencing fan flutter over time.
Figure 9A:
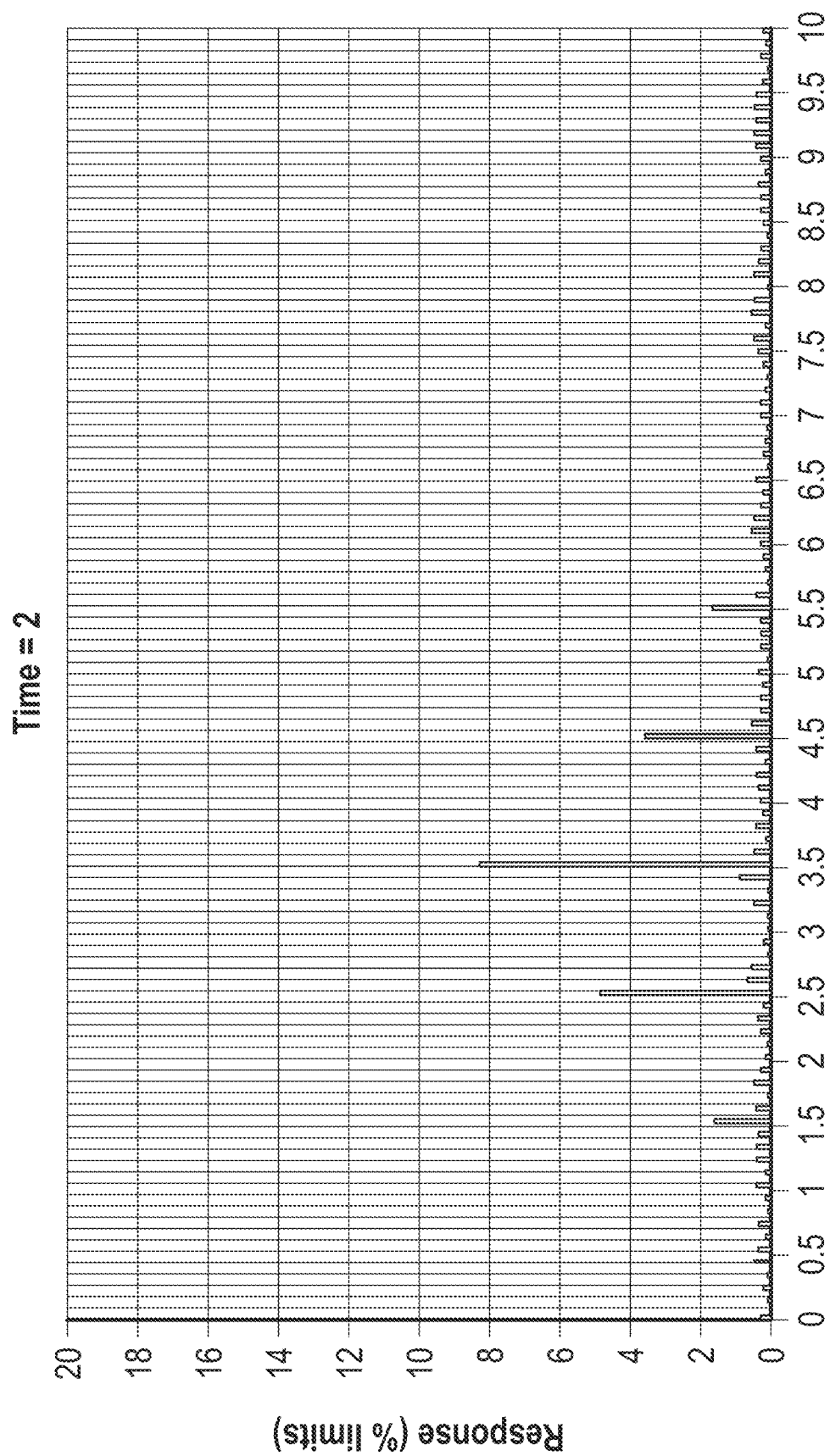
FIG. 9A is a chart showing a FFT of the data of FIG. 8 at time 2 of the chart shown in FIG. 8.
Figure 9B:
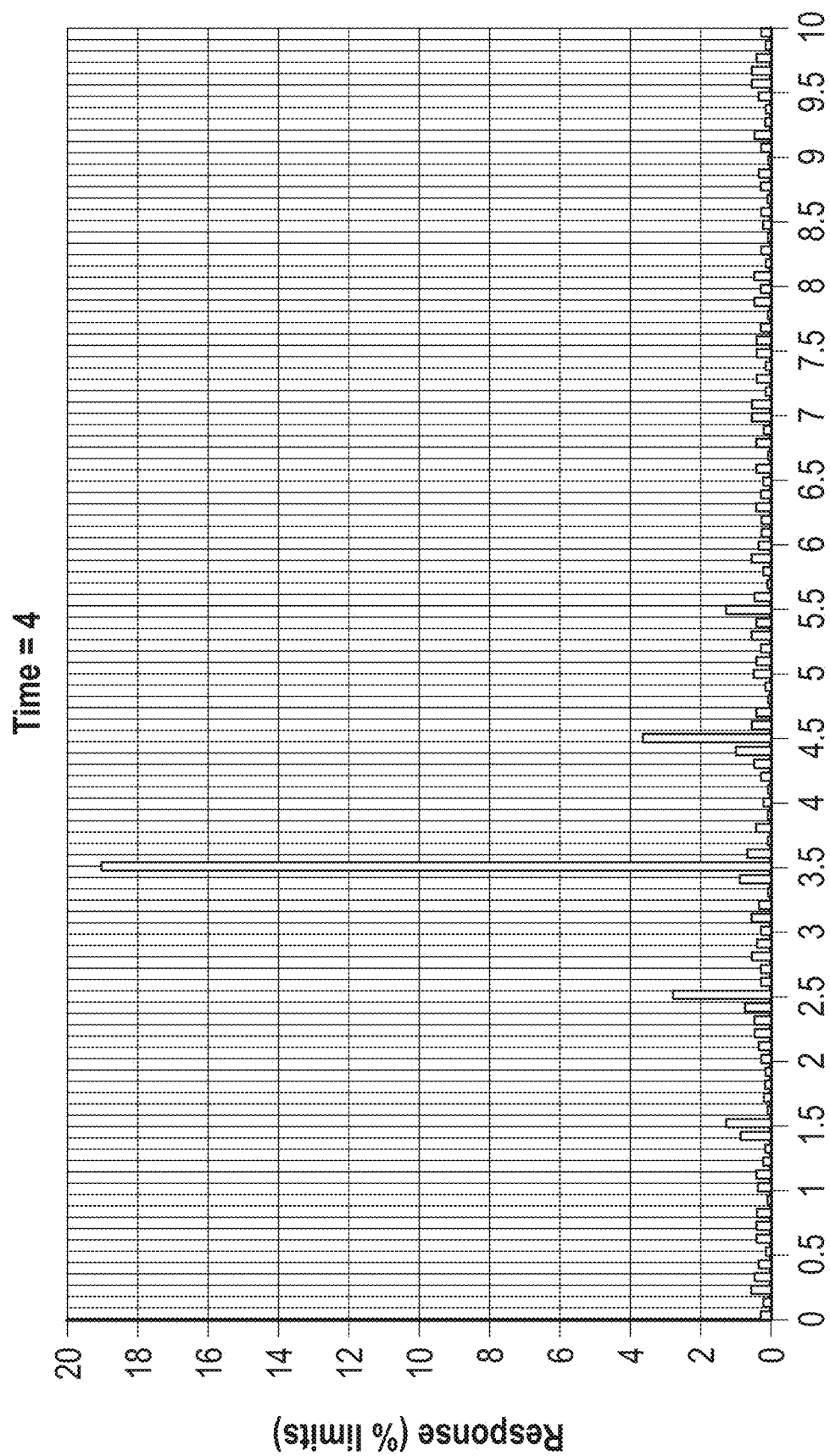
FIG. 9B is a chart showing a FFT of the data of FIG. 8 at time 4 of the chart shown in FIG. 8.
Figure 9C:
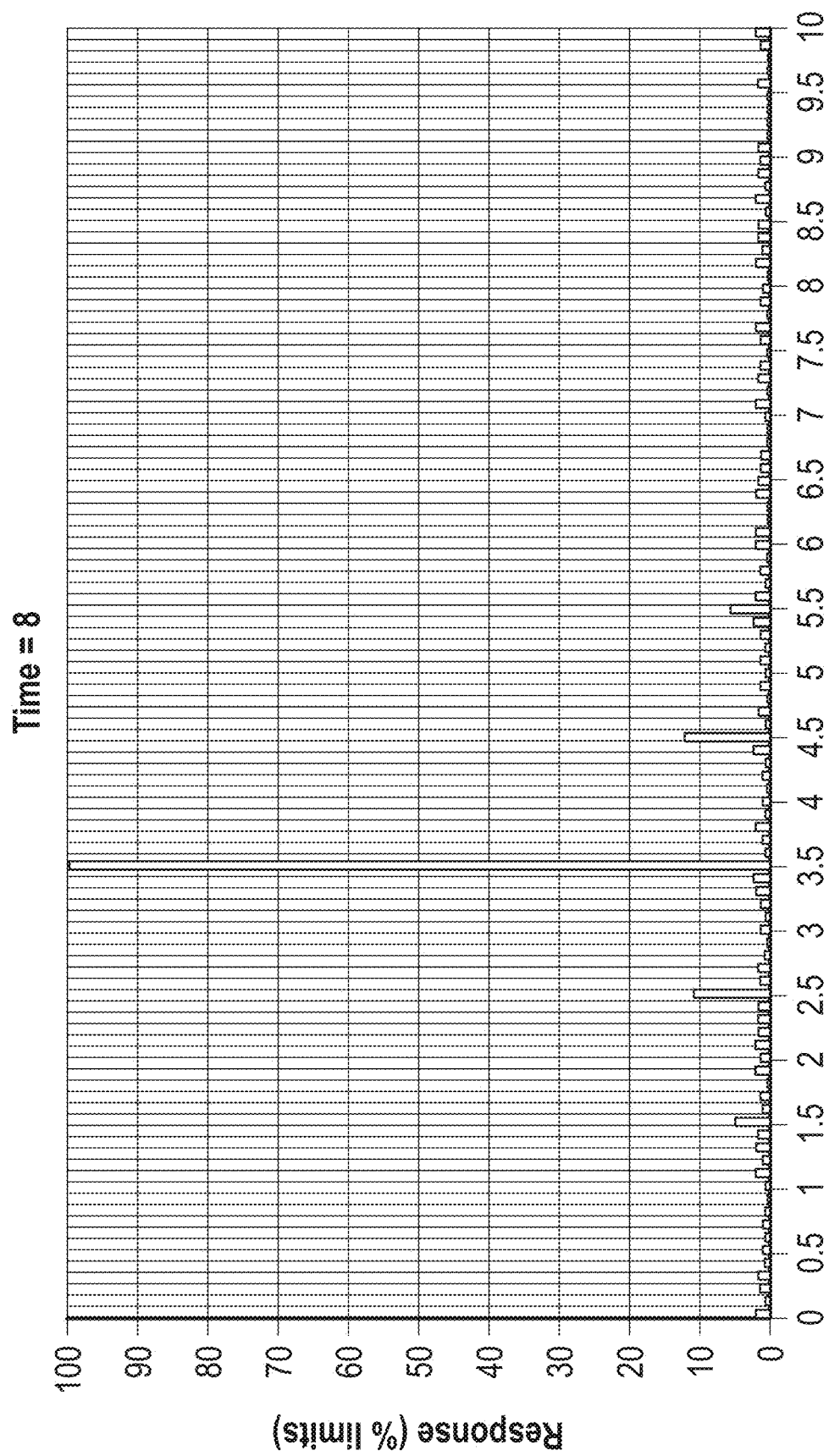
FIG. 9C is a chart showing a FFT of the data of FIG. 8 at time 8 of the chart shown in FIG. 8.

FIGS. 6 through 9C show example analyses and graphs for abnormal fan deflection and fan flutter. FIGS. 6 through 7C correspond to engine 112 experiencing increasingly turbulent incoming air flow, while FIGS. 8 through 9C are directed toward engine 112 experiencing fan flutter.

FIG. 6 illustrates a model for response over time of system 100 as system 100 is subjected to increasingly turbulent incoming air flow. The response is shown as a percent (%) of a limit of system 100, where 100% corresponds to the threshold, represented by a horizontal dashed line. The threshold may relate to an endurance limit of the material which comprises fan blade 116. Each point on the graph of FIG. 6 represents a determined deflection value which is calculated at the same single point on fan blade 116. A magnitude of each determined deflection value may be observed to diagnose abnormal deflection due to turbulent air flow. As shown, the response to increasingly turbulent incoming air flow is often slow growing and is dominated by low order fundamental modes with largely random phase between fan blades 116.

FIGS. 7A, 7B, and 7C represent FFT analyses of the data of FIG. 6 at time 2, time 4, and time 8, respectively, from the chart of FIG. 6. For the response type of FIG. 6, multiple spikes representing vibration in fundamental modes with random phase and/or nodal diameter in between may be observed. As the response increases, the magnitude of the dominant spikes increases, and indicates increasing instability in fan 114 and engine 112.

FIG. 8 illustrates a model for response over time of system 100 as system 100 experiences fan flutter. As in FIG. 6, the threshold is represented by a horizontal dashed line at 100%, and may correspond to an endurance limit of the material which comprises fan blade 116 or to another property. Like FIG. 6, each point on the graph of FIG. 8 represents a determined deflection value. Fan flutter is indicated by a rapidly increasing response over time. In situations involving fan flutter, the phase of the determined deflection value, in addition to the magnitude, may be analyzed to more accurately and quickly diagnose fan flutter.

FIGS. 9A, 9B, and 9C represent FFT analyses of the data of FIG. 8 at time 2, time 4, and time 8, respectively, of the chart of FIG. 8. When fan blade 116 experiences fan flutter, even at small amplitudes, there is response at only a few frequencies. As time goes on, the response becomes dominant by a single frequency, then begins to increase very rapidly at that single frequency.

In aspects, artificial intelligence (AI) such as machine learning (ML) algorithms may be used to enhance monitoring and prevention of fan blade deflection and/or fan flutter of engine 112 (or one or more components thereof) by improving the accuracy, efficiency, and/or robustness of the analysis process. For example, a convolutional neural network (CNN) can be trained to detect and analyze fan blades 116 in high-speed video footage. This provides a benefit over traditional tracking software, as AI such as a CNN can handle complex motion patterns and occlusions more effectively than present methods while filtering out noise. Moreover, an ML algorithm can automate the extraction of relevant features from high-speed footage, such as blade edge detection, deformation patterns, and/or vibration frequencies, thereby reducing the need for manual intervention and increasing the consistency of the analysis.

Such ML algorithms can be used to provide insights into the vibrational and/or noise characteristics of, for instance, fan blades 116, helping to identify potential issues and/or areas for improvement in installation and operation thereof. For example, ML models may predict future vibration and/or noise levels and/or potential failures of, for instance, fan blades 116 based on historical data. Moreover, ML models may define normal operational behavior and identify deviations in vibrational or noise patterns that indicate potential issues with, for instance, fan blades 116 and/or other aircraft components. Such ML models may continuously with new data to improve their accuracy and/or adaptability to changing conditions.

Various additional implementations of AI with retroreflective enhanced high-speed imaging are contemplated and within the scope of this disclosure, including but not limited to ML, deep learning (e.g., recurrent neural networks (RNNs), generative adversarial networks (GANs), and/or computer vision algorithms.

The phrases "in an aspect," "in aspects," "in various aspects," "in some aspects," or "in other aspects" may each refer to one or more of the same or different aspects in accordance with this disclosure. A phrase in the form "A or B" means "(A), (B), or (A and B)." A phrase in the form "at least one of A, B, or C" means "(A); (B); (C); (A and B); (A and C); (B and C); or (A, B, and C)."

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Further aspects of the present disclosure are provided by the subject matter of the following clauses.

A system for preventing abnormal fan blade deflection or fan flutter in an engine includes an optical emitting source, an optical receiver, a retroreflector, a processor, and a memory. The optical emitting source is configured to provide radiant flux. The optical receiver is configured to detect radiant flux. The retroreflector is configured to be disposed on a fan blade of an engine. The memory includes instructions stored thereon, which, when executed by the processor cause the system to emit radiant flux from the optical emitting source towards the retroreflector when the retroreflector is disposed on the fan blade and the engine is operating; receive an incident radiant flux from the retroreflector by the optical receiver; determine a deflection value of the fan blade based on the incident radiant flux received by the optical receiver; determine whether the deflection value is greater than or equal to a threshold for deflection of the fan blade to identify abnormal fan blade deflection or fan flutter; and selectively change a state of the engine when abnormal fan blade deflection or fan flutter is identified.

The system according to the preceding clause, wherein the deflection of the fan blade corresponds to at least one of a magnitude of vibration of the fan blade, a frequency of vibration of the fan blade, or a phase of vibration of the fan blade.

The system according to any preceding clause, wherein the threshold is determined based on a parameter, and wherein the parameter is at least one of a material property of the fan blade, a shape of the fan blade, or a size of the fan blade.

The system according to any preceding clause, wherein the deflection value is a deflection magnitude and phase of the fan blade as a function of frequency, as determined by Fast Fourier Transform.

The system according to any preceding clause, wherein, if the determined deflection is greater than or equal to the threshold for deflection of the fan blade, the instructions, when executed by the processor, further cause the system to set a boundary condition.

The system according to any preceding clause, wherein the boundary condition corresponds to at least one of a fan speed, an aircraft speed, a propellor torque, a propellor thrust, or a propellor power.

The system according to any preceding clause, wherein the retroreflector is located on the fan blade in an area configured to optimize detection of deflection of the fan blade.

The system according to any preceding clause, wherein the optical emitting source and the optical receiver are disposed within at least one of an electronics housing or an optics housing.

The system according to any preceding clause, wherein at least one of the electronics housing or the optics housing is located within about 60 degrees of a normal incidence angle of the retroreflector.

The system according to any preceding clause, wherein the optical receiver is at least one of a photodiode, a photomultiplier tube (PMT), an avalanche photodiode (APD), a photon counting APD, a complementary metal oxide semiconductor (CMOS) imager, or a charge-coupled device (CCD) imager.

The system according to any preceding clause, wherein the instructions, when executed by the processor further cause the system to change at least one of a torque, a thrust, or a power demand based on the determination that the deflection value is greater than or equal to the threshold for deflection of the fan blade.

A processor-implemented method for preventing abnormal fan blade deflection or fan flutter in an engine comprises: emitting radiant flux from an optical emitting source towards a retroreflector when the retroreflector is disposed on the fan blade of the engine and the engine is operating; receiving an incident radiant flux from the retroreflector by the optical receiver; determining a deflection value of the fan blade based on the incident radiant flux received by the optical receiver; determining whether the deflection value is greater than or equal to a threshold for deflection of the fan blade to identify abnormal fan blade deflection or fan flutter; and selectively changing a state of the engine when abnormal fan blade deflection or fan flutter is identified.

The processor-implemented method according to the preceding clause, wherein the deflection of the fan blade corresponds to at least one of a magnitude of vibration of the fan blade, a frequency of vibration of the fan blade, or a phase of vibration of the fan blade.

The processor-implemented method according to any preceding clause, wherein the threshold is determined based on a parameter, and wherein the parameter is at least one of a material property of the fan blade, a shape of the fan blade, or a size of the fan blade.

The processor-implemented method according to any preceding clause, further comprising determining the deflection of the fan blade by analyzing the incident radiant flux and determining a magnitude and a phase of deflection as a function of frequency by a Fast Fourier Transform.

The processor-implemented method according to any preceding clause, further comprising causing the detector to set a boundary condition when the determined deflection is greater than or equal to the threshold for deflection of the fan blade.

The processor-implemented method according to any preceding clause, wherein the boundary condition corresponds to at least one of a fan speed, an aircraft speed, a propellor torque, a propellor thrust, or a propellor power.

The processor-implemented method according to any preceding clause, wherein the retroreflector is located on the fan blade in an area configured to optimize detection of deflection of the fan blade.

The processor-implemented method according to any preceding clause, wherein the optical emitting source and the optical receiver are disposed within at least one of an electronics housing or an optics housing.

An aircraft including a system for preventing abnormal fan blade deflection or fan flutter in an engine of the aircraft includes an electronics housing, a retroreflector, a processor, and a memory coupled to the processor. The electronics housing is disposed on the aircraft and includes an optical emitting source configured to provide radiant flux and an optical receiver. The retroreflector is configured to be disposed on a fan blade of the engine. The memory includes instructions stored thereon which, when executed by the processor cause the system to: emit radiant flux from the optical emitting source towards the retroreflector when the retroreflector is disposed on the fan blade and the engine is operating; receive an incident radiant flux from the retroreflector by the optical receiver; determine a deflection value of the fan blade based on the incident radiant flux received by the optical receiver; determine whether the deflection value is greater than or equal to a threshold for deflection of the fan blade to identify abnormal fan blade deflection or fan flutter; and selectively change a state of the engine when abnormal fan blade deflection or fan flutter is identified.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that this disclosure is not limited to the precise aspects described, and that various other changes and modifications may be effectuated by one skilled in the art without departing from the scope or spirit of the disclosure. Additionally, the elements and features shown or described in connection with certain aspects may be combined with the elements and features of certain other aspects without departing from the scope of this disclosure, and that such modifications and variations are also included within the scope of this disclosure. Accordingly, the subject matter of this disclosure is not limited by what has been particularly shown and described.

What is claimed is:

1. A system for preventing abnormal fan blade deflection or fan flutter in an engine, the system comprising:
    an optical emitting source configured to provide radiant flux;
    an optical receiver configured to detect incident radiant flux, wherein the optical receiver is separate from the optical emitting source, the optical emitting source and the optical receiver disposed in a pylon supporting the engine;
    a retroreflector configured to be disposed on a fan blade of the engine;
    a processor; and
    a memory, including instructions stored thereon, which, when executed by the processor cause the system to:
        emit the radiant flux from the optical emitting source towards the retroreflector when the retroreflector is disposed on the fan blade and the engine is operating;
        receive the incident radiant flux from the retroreflector by the optical receiver;
        determine a deflection value of the fan blade based on the incident radiant flux received by the optical receiver;
        determine whether the deflection value of the fan blade is greater than or equal to a threshold for deflection of the fan blade to identify the abnormal fan blade deflection or fan flutter; and
        selectively change a state of the engine when the abnormal fan blade deflection or fan flutter is identified.

2. The system according to claim 1, wherein the deflection value of the fan blade corresponds to at least one of a magnitude of vibration of the fan blade, a frequency of vibration of the fan blade, or a phase of vibration of the fan blade.

3. The system according to claim 1, wherein the threshold for deflection of the fan blade is determined based on a parameter, and wherein the parameter is at least one of a material property of the fan blade, a shape of the fan blade, or a size of the fan blade.

4. The system according to claim 1, wherein the deflection value is a deflection magnitude and phase of vibration of the fan blade as a function of frequency, as determined by a Fast Fourier Transform.

5. The system according to claim 1, wherein, if the deflection value is greater than or equal to the threshold for deflection of the fan blade, the instructions, when executed by the processor, further cause the system to set a boundary condition.

6. The system according to claim 5, wherein the boundary condition corresponds to at least one of a fan speed, an aircraft speed, a propellor torque, a propellor thrust, or a propellor power.

7. The system according to claim 1, wherein the retroreflector is located on the fan blade in an area configured to optimize detection of the abnormal fan blade deflection or fan flutter.

8. The system according to claim 1, wherein the optical emitting source and the optical receiver are disposed within at least one of an electronics housing or an optics housing.

9. The system according to claim 8, wherein at least one of the electronics housing or the optics housing is located within plus or minus 15% of 60 degrees of a normal incidence angle of the retroreflector.

10. The system according to claim 1, wherein the optical receiver is at least one of a photodiode, a photomultiplier tube (PMT), an avalanche photodiode (APD), a photon counting APD, a complementary metal oxide semiconductor (CMOS) imager, or a charge-coupled device (CCD) imager.

11. The system according to claim 1, wherein the instructions, when executed by the processor further cause the system to:
    change at least one of a torque, a thrust, or a power demand based on a determination that the deflection value is greater than or equal to the threshold for deflection of the fan blade.

12. The system according to claim 1, wherein the retroreflector is at least one of a retroreflective film or sheeting, a corner cube reflector, a prismatic retroreflector, or a full cube retroreflector.

13. The system according to claim 1, further including an adjustable optics housing, wherein the adjustable optics housing is configured to alter at least one of a spot shape or a spot size of the radiant flux.

14. A processor-implemented method for preventing abnormal fan blade deflection or fan flutter in an engine, the method comprising:
    emitting radiant flux from an optical emitting source towards a retroreflector when the retroreflector is disposed on a fan blade of the engine and the engine is operating;
    receiving an incident radiant flux from the retroreflector by an optical receiver, wherein the optical receiver is separate from the optical emitting source, the optical emitting source and the optical receiver disposed in a pylon supporting the engine;
    determining a deflection value of the fan blade based on the incident radiant flux received by the optical receiver;
    determining whether the deflection value is greater than or equal to a threshold for deflection of the fan blade to identify the abnormal fan blade deflection or fan flutter; and
    selectively changing a state of the engine when the abnormal fan blade deflection or fan flutter is identified.

15. The processor-implemented method according to claim 14, wherein the deflection value of the fan blade corresponds to at least one of a magnitude of vibration of the fan blade, a frequency of vibration of the fan blade, or a phase of vibration of the fan blade.

16. The processor-implemented method according to claim 14, wherein the threshold for deflection of the fan blade is determined based on a parameter, and wherein the parameter is at least one of a material property of the fan blade, a shape of the fan blade, or a size of the fan blade.

17. The processor-implemented method according to claim 14, further including:
    determining the deflection value of the fan blade by analyzing the incident radiant flux and determining a magnitude and a phase of vibration as a function of frequency by a Fast Fourier Transform.

18. The processor-implemented method according to claim 14, further including:
    causing a detector to set a boundary condition when the deflection value is greater than or equal to the threshold for deflection of the fan blade.

19. The processor-implemented method according to claim 18, wherein the boundary condition corresponds to at least one of a fan speed, an aircraft speed, a propellor torque, a propellor thrust, or a propellor power.

20. The processor-implemented method according to claim 14, wherein the retroreflector is located on the fan blade at a location on the fan blade with a highest likelihood of deflection on the fan blade.

21. The processor-implemented method according to claim 14, wherein the optical emitting source and the optical receiver are disposed within at least one of an electronics housing or an optics housing.

22. An aircraft including a system for preventing abnormal fan blade deflection or fan flutter in an engine of the aircraft, the aircraft comprising:
- a fan blade;
- an electronics housing disposed on the aircraft, the electronics housing including an optical emitting source configured to provide radiant flux and an optical receiver, wherein the optical receiver is separate from the optical emitting source;
- a retroreflector on the fan blade of the engine, the fan blade including only a single retroreflector;
- a processor; and
- a memory, including instructions stored thereon, which, when executed by the processor cause the system to:
  - emit the radiant flux from the optical emitting source towards the retroreflector when the retroreflector is disposed on the fan blade and the engine is operating;
  - receive an incident radiant flux from the retroreflector by the optical receiver;
  - determine a deflection value of the fan blade based on the incident radiant flux received by the optical receiver;
  - determine whether the deflection value is greater than or equal to a threshold for deflection of the fan blade to identify the abnormal fan blade deflection or fan flutter; and
  - selectively change a state of the engine when the abnormal fan blade deflection or fan flutter is identified.

* * * * *